United States Patent [19]

Doucet

[11] 4,430,232

[45] Feb. 7, 1984

[54] DISC FILTER FOR LIQUIDS

[76] Inventor: Charles Doucet, 20, avenue Tronchet, 1226 Thônex, Switzerland

[21] Appl. No.: 344,519

[22] Filed: Feb. 1, 1982

[51] Int. Cl.³ .................... B01D 25/18; B01D 29/38
[52] U.S. Cl. ............................ 210/798; 210/351; 210/352; 210/356; 210/411; 210/453; 210/488
[58] Field of Search ............... 210/323.1, 332, 333.01, 210/350, 352, 354, 356, 391, 411, 412, 413, 415, 446, 453, 488, 791, 797, 798, 351, 437

[56] References Cited

U.S. PATENT DOCUMENTS

| 1,643,299 | 9/1927 | Furness | 210/488 |
| 3,179,116 | 4/1965 | Jacobs | 210/356 |
| 3,622,003 | 11/1971 | Czech | 210/356 |
| 3,937,281 | 2/1976 | Harnsberger | 210/356 |
| 4,123,356 | 10/1978 | Sugimoto et al. | 210/798 |

FOREIGN PATENT DOCUMENTS

| 1007743 | 5/1957 | Fed. Rep. of Germany | 210/411 |
| 55-47111 | 4/1980 | Japan | 210/356 |
| 434959 | 11/1974 | U.S.S.R. | 210/411 |

Primary Examiner—Peter A. Hruskoci
Attorney, Agent, or Firm—Martin Smolowitz

[57] ABSTRACT

A disc filter of the counter-current flow cleaning type in which the filtering body has a general cylindrical annular shape with a central cylindrical flow channel extending axially along the length of said filter body. It has annular solid filter elements spaced from each other in uniform sequence by resiliently deformable but incompressible spacer elements which allows the thickness of the slot existing between the adjacent filtration elements to be varied as a function of the axial pressure exerted on the filtering body by a support part. This variation occurs between a small thickness corresponding to the desired degree of filtration, and a maximum thickness provided to allow the cleaning of the filter by the passage in counter-current of a cleaning liquid through the thus enlarged slots. The filter elements have, in cross-section, a hydrodynamic, lenticular section, leaving between each other, a converging passage where solid materials are retained.

15 Claims, 10 Drawing Figures

DISC FILTER FOR LIQUIDS

BACKGROUND OF THE INVENTION

Known rapid filters employ in general as a filtering screen, defined by either a lattice (woven metal cloth), a perforated metal sheet, or grids comprised of various profiled wires, or rigid piles of washers, plates or discs, without any special hydraulic profile.

The disadvantages of such construction are as follows:

With the lattice construction employing the perforated metal sheet (or perforated cylinder) and the grid, when cleaning takes place by reversing the current or back-wash cleaning, which represents the system most widely used; the fibers which may be in the liquid, slip around the passages, during cleaning a fiber will not pass the same hole or slot as the one through which it has already passed during the filtration, with the result that "felting" of the filter members takes place, necessitating them to be changed.

With all the direct acting filter elements, that is to say without any sand-bed or without a pre-layer, the passages are located at the surface and the impurities of various sizes and shapes clog those passages by collecting next to one another.

The hydraulic profiles of the filtering bodies are not designed to give a minimum loss of load and to eliminate the turbulence, which promote the deposit of impurities.

While the impurities having dimensions larger than the mesh void or larger than the perforation remain up-stream of the filtering surface, and the impurities of smaller dimensions pass through the mesh or slots, a quantity of particles having substantially the dimensions of the passage openings are caught between the wires, bars or edges of those openings, thus causing little, by little the clogging of any filter element despite cleaning.

There are also known filters of the counter-current cleaning type, formed by a helical spring having a length that may be varied; for example, the distance between turns, to change from the filtering mode, where the turns are close to each other; to the cleaning mode, where the turns are spaced apart from each other, and vice versa.

However, filters with this type of construction the distance between turns is constant and presents the short coming that it is not possible in practice, to obtain a distance beteen turns sufficient to provide for a given filtering degree. The present invention aims at remedying to the shortcomings which have just been mentioned, of the different types of known back-washing filters.

SUMMARY OF THE INVENTION

According to the principal features of the present invention there is provided a disc filter for liquids, of the counter-current cleaning type, comprising a series of coaxial annular filtering elements forming a generally cylindrical shaped assembly and providing therebetween annular filtering passages, wherein there comprises resiliently yieldable spacer elements, arranged locally between the filtering elements, and means for varying distance between the various filter elements, by varying pressure exerted on the spacer elements.

The main object of the invention is to overcome the defects of the prior art.

Other objects and advantages will best be understood with respect to the accompanying specification, claims and drawings.

BRIEF DESCRIPTION OF DRAWINGS

The drawings illustrate a plurality of embodiments of the filter according to the invention as set forth in the accompanying specifications and claims.

DESCRIPTION OF THE INVENTION

Figure 1:
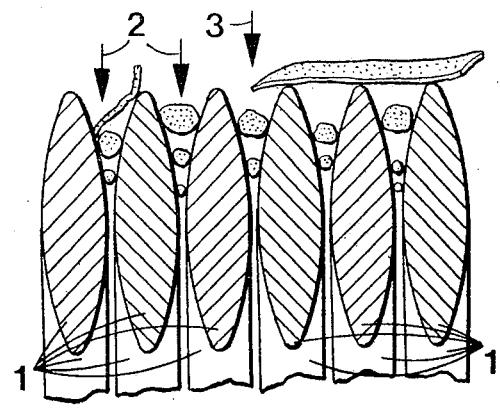
FIGS. 1 and 2 are diagrammatical views in partial cross-section illustrating the principle and operation of the filter according to the invention.
Figure 2:
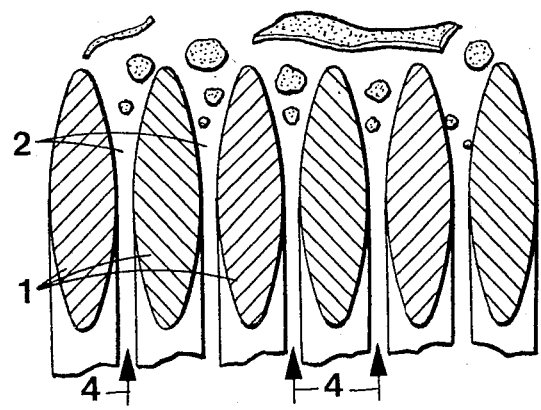

FIGS. 1 and 2 represent a portion of a filter formed by a series of filter elements 1 each being formed ring with a hydrodynamic lenticular-shaped cross-section. In FIG. 1, the elements 1 are in a filtration position, for which they are brought toward each other so as to leave therebetween converging filtration slots or passages 2 in which the liquid to be filtered flows in the centripetal direction as indicated by the arrow 3. This shape allows one to automatically obtain a stratification of solid bodies and particles in the annular slots 2, the smaller bodies being retained at the bottom and the bigger ones at a distance from the bottom of the converging portion, as illustrated in FIG. 1. Therefore, it is possible to absorb more impurities for a given surface. Furthermore, the hydrodynamic shape of the cross-section of rings 1 prevents turbulence and cavitation of the liquid and improves the efficiency.

FIG. 2 represents the same part of the filter during the back-washing operation. The elements 1 are more spaced apart than in the case of FIG. 1 and liquid which has already been filtered goes through the slots 2 in a centrifugal fashion as indicated by the arrows 4. Then, it is obvious that all bodies and particles which had been retained by the elements 1 during the filtration phase, are detached from those elements and entrained by the washing liquid.

Figure 3:
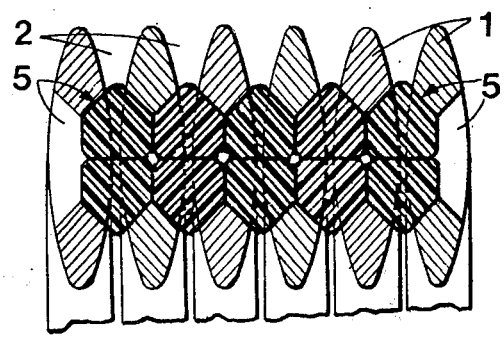
FIGS. 3 and 4 are respectively views similar to FIGS. 1 and 2, illustrating construction by means of which the operation of FIGS. 1 and 2 is effectively implemented.
Figure 4:
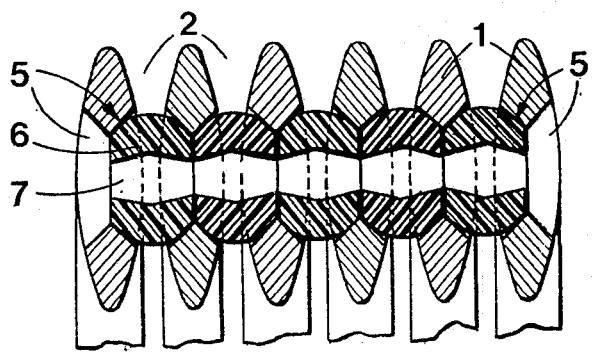

This having been explained for the purpose of a good understanding of the operation of a filter according to the invention. FIGS. 3 and 4 will now be described, illustrating the means for which the operation according to FIGS. 1 and 2 is provided.

Each ring 1 has on each of its opposite faces small cavities or alveoli 5, preferably three and circumferentially spaced by 120°. The alveoli of different rings are in alignment according to straight lines parallel to the generally cylindrical shaped assembly formed by these rings. Between each pair of alveoli facing each other and pertaining to adjacent rings, there is arranged a spacer element 6 of resiliently yieldably material but substantially incompressible, such as rubber, for example. In a free state, these elements 6 have substantially the shape visible in FIG. 4, that is to say, the shape of a ball to which two identical and coaxial domes would have been removed. In the inside, each spacer element 6 has a center channel 7 drilled perpendicularly to two parallel planes that each spacer element 6 has. Those elements 6 are placed in the various alveoli 5, during the assembly so as to contact one another at their flat portions, their channels 7 being then in alignment (see FIG. 4).

FIG. 4 shows the maximum spaced apart position of elements 2, corresponding to the back-washing according to FIG. 2. This maximum spacing provides for maintaining the spacer elements 6 slightly pressed and in a correct position in the alveoli 5.

The filtration elements 1 are brought to the closer position corresponding to the filtration work (FIGS. 1 and 3) simply by exerting a predetermined axial pressure on the assembly of these filtration elements 1, so as to press and resiliently deform the elements 6 so that they take, in cross-section, the shape represented in FIG. 3, where channel 7 (FIG. 4) has disappeared by deformation of the spacer elements 6, which have been slightly flattened in the axial direction of the assembly. This allows the bringing together of the elements filter 1 to the desired extent, to ensure the filtration. It is obvious that for each particular case, it is possible to determine by calculation, the force to be applied to provide the desired accurate spacing of the rings 1.

When the pressure exerted holding the rings 1 in the filtration position is released, the resilient spacer elements 6 automatically return to their initial position and the rings 1 return to the spread apart cleaning position (FIG. 4). A stop, now shown, is preferably provided to limit the crushing of the spacer elements 6 in the cylindrical assembly of elements 1, to a degree corresponding to the desired spacing of those elements 1 during the filtration phase.

It is to be noted that the thickness of the filter elements 1 in the flow direction of the liquid between these elements, is relatively large, which has the advantage of preventing substantially any slipping of fibers of a normal length and, subsequently, to prevent the felting of the filter.

Furthermore, the spacer elements 6 acting during their resilient deformation without friction, causes the displacement of rings 1 in a way which respects and maintains the equidistance of these rings. Thus, the fineness of filtration is kept constant at the desired value.

It is to be understood that, although what has been described hereabove is the case of a filter with centripetal circulation during filtration and centrifugal circulation during washing or cleaning, the operation would be similar in the case of centrifugal circulation during filtration and centripetal during back-washing, due to the lenticular shape of the cross-section of elements 1.

Figure 5:
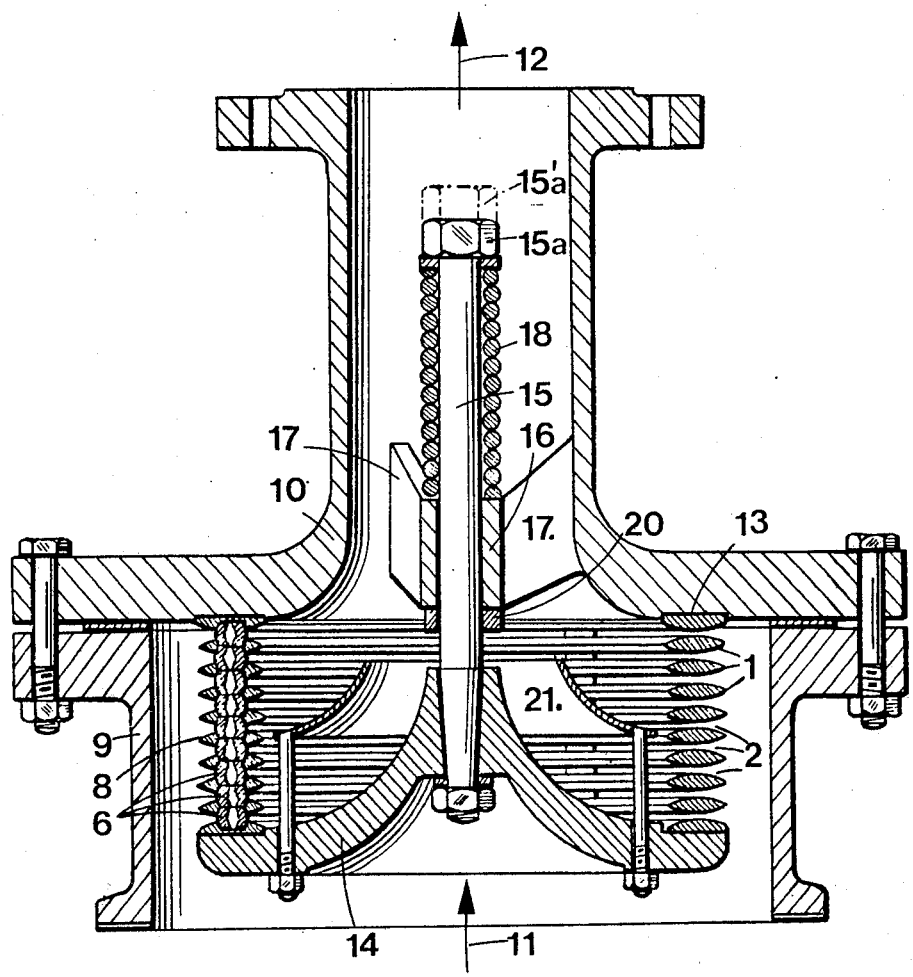
FIG. 5 is an axial cross-section view of a first embodiment of the invention.

In the form of execution according to FIG. 5, there is shown a filtering body 8 having a generally cylindrical annular shape, formed by filter elements such as those which have just been described in reference to FIGS. 2 and 3. This body 8 is arranged in an envelope of two pieces 9, 10 made integral one with the other. The filtering body 8 is mounted as a suction strainer of a pump which is not represented. During the filtration phase, the liquid to be filtered is sucked in the direction of the arrow 11, thereas the filtered liquid goes to the pump in the direction of the arrow 12, after centripetally passing through the slots that are left between the rings of the filtering body 8, the description of which will not be repeated.

For passing from the filtration phase to the back-washing phase and vice versa, the following means are provided.

The filter body 8 is maintained between a flat portion 13 of part 10 and a support part 14 carried by an axial rod 15 capable of sliding in a fixed guiding cylinder 16 maintained in the axis of part 10 by radial arms 17. A compression spring 18 is arranged about the rod 15 and bears, on one hand, on the fixed cylinder 16 and, on the other hand, on a head 15a located at the free end of the rod 15.

BEST MODE OF INVENTION

The filtering body 8 has a general cylindrical annular shape. It has filtration annular elements 1 spaced from each other in uniform sequence by resiliently deformable but incompressible space elements 6 which allows the thickness of the slot 2 existing between the adjacent filtration elements 1 to be varied as a function of the axial pressure exerted on the filtering body 8 by a support part 14. This variation occurs between a small thickness corresponding to the desired degree of filtration, and a maximum thickness provided to allow the cleaning of the filter by passage in counter-current of a cleaning liquid through the thus enlarged slots. The filtration elements 1 have, in cross-section, a hydrodynamic, lenticular section, leaving between each other, a converging passage where solid materials are retained.

Operation of the invention is as follows:

During the filtration phase, the spring force and the pressure of the liquid coming at 11, cause part 14 to take its upper end position at which it abuts against a top 20 integral with the fixed cylinder 16. The filtration rings are then in their closer position corresponding to the desired degree of filtration.

During the cleaning phase, the pump is stopped and the water column down stream of the pump goes down and in conjunction with the tension of the spacer elements 6, pushes the support part 14 downwards (against the action of spring 18), up to the position shown, where the spring turns are in contact between each other, thereby limiting the descending motion of part 14.

To make sure that the liquid has a substantially uniform action on the entire length (in the axial direction) of the body 8, there is provided in the space inside such body, a profiled annular deflector 21 arranged axially and integral with the part 14; the latter being also profiled, to obtain an advantageous flow of cleaning liquid in the direction of the slots of the body 8. Without such deflector 21, there would generated, by dynamic effect, a higher pressure in the inside of the lower region of the body 8 and a low pressure at the other end. The cleaning would only be efficient in that lower region.

Nothing prevents one from arranging a plurality of deflectors 21, according to the (axial) length of the body 8.

When the pump is started again, the spring and the water pressure entering at 11 bring the members back to a filtration position. The head 15a returns to 15'a.

If the liquid flow is to be stopped when the pump is not working, a valve (not shown) mounted at the upper flange of part 10 is closed. Of course, there is no foot valve or non-return valve in this case.

Figure 6:
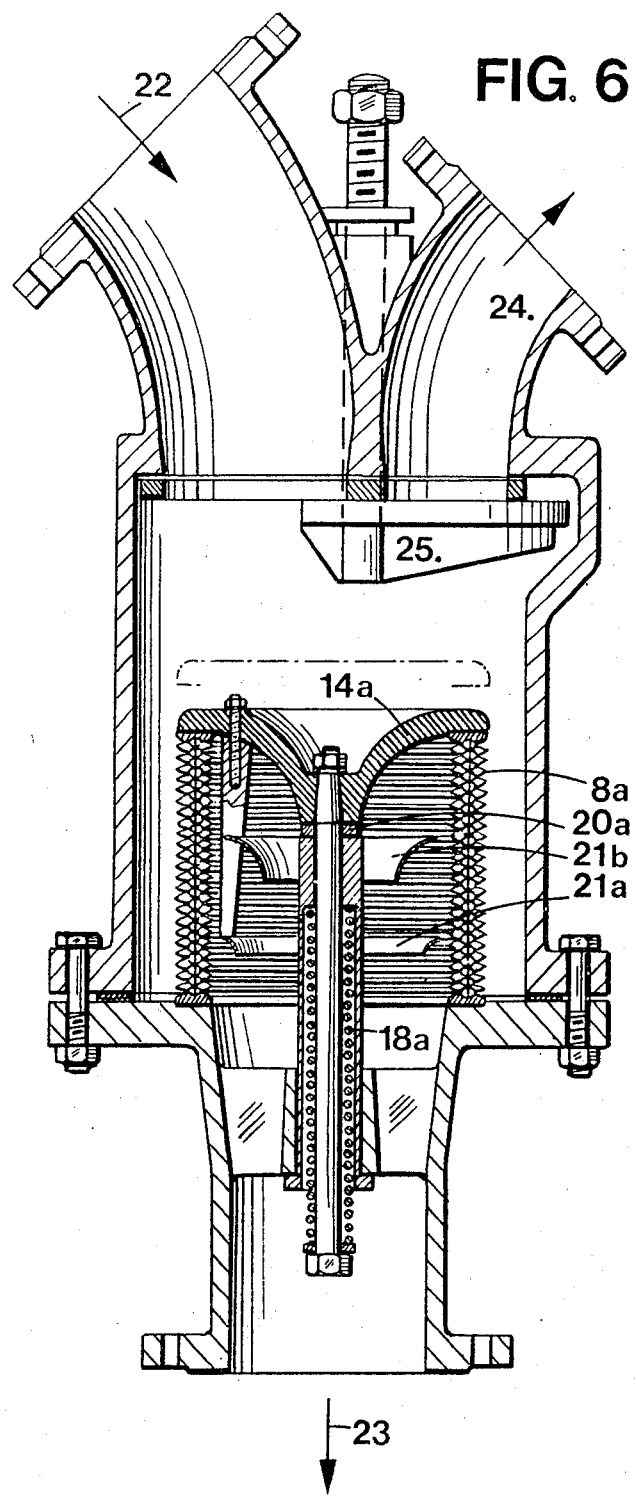
FIG. 6 is an axial cross-section view of a second embodiment of the invention.

FIG. 6 represents a filtering body 8a similar to body 8 of FIG. 5, in the case of a filter under pressure. To simplify the drawing, the spacer elements 6 as in FIG. 4 have not been represented.

In the filtration phase, the liquid to be filtered enters at 22 and comes out filtered at 23. A drain outlet, only used for back-washing, is provided at 24.

The members are represented in the filtration position, where a rotary valve 25 closes the drain 24 and opens the supply of water to be filtered at 22. The pressure of a spring 18a causes a support part 14a to abut against the stop 20a and the filtration elements or rings of the body 8a are in an accurate filtration position. The filtration is effected in a centripetal mode.

To pass to the cleaning mode, the valve 25 is actuated to close the water supply at 22 and open the drain 24. Also, the filtered liquid is allowed to flow backwards to the lower portion, in the reverse direction of the arrow 23, to provide for the washing. Under the combined effect of the pressure due to this return and of the elasticity of the resilient spacer members pressed during filtration, the support piece 14 is pushed upwardly in a desired extent, against the action of the spring 18a, which is then compressed to limit the stroke, when the turns are touching each other. In this FIG. 6 example, there is provided two deflectors 21a, 21b, instead of a single one as in the case of FIG. 5, to further improve the washing.

As soon as the valve 25 is brought back to the position shown, a new filtration phase automatically starts again.

Figure 7:
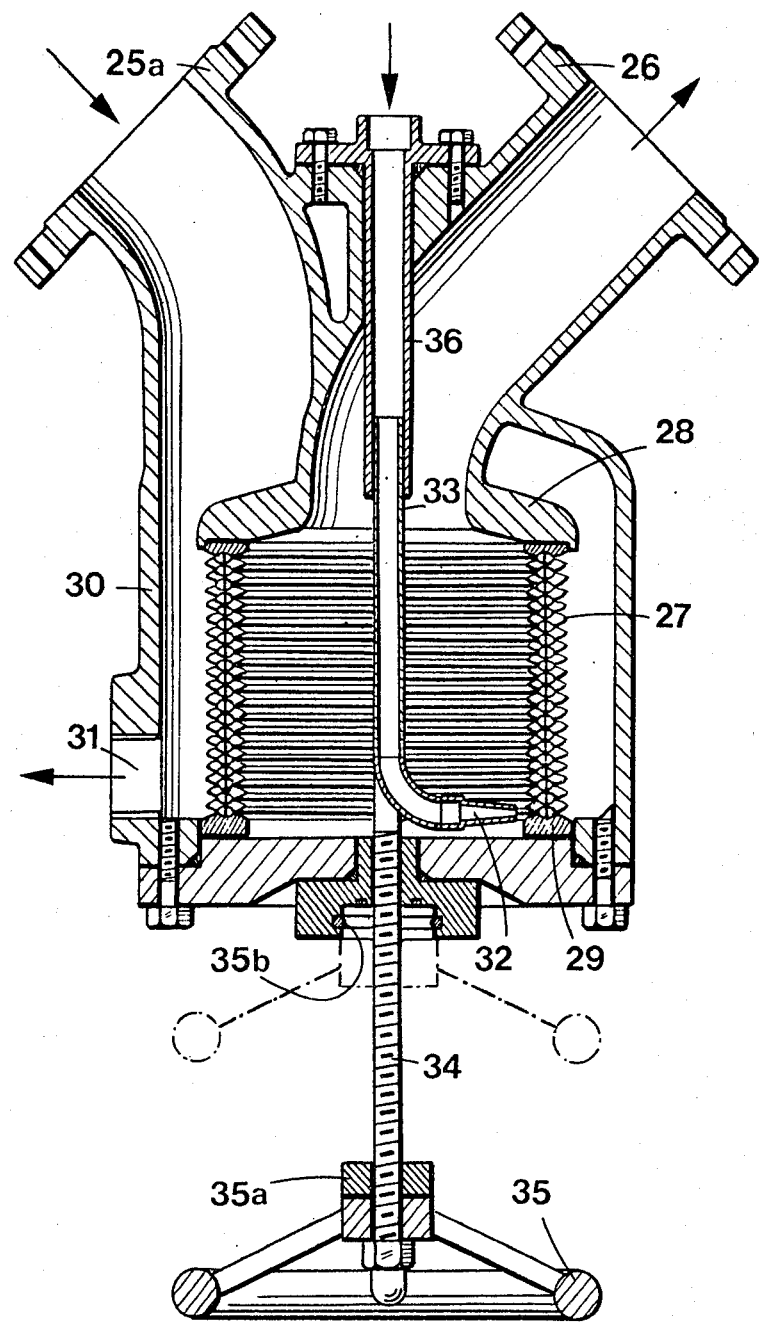
FIG. 7 is an axial cross-section view of a third embodiment of the invention.

The embodiment according to FIG. 7 is connected to a supply conduit of liquid to be filtered, by an inlet flange 25a and, it is connected to an outgoing conduit of filtered liquid, by means of an outlet flange 26. As in the preceding example, the resilient spacer elements arranged between the annular filter elements have not been represented, but it is understood that in all the examples, the same visible construction arrangement as in FIGS. 3 and 4 is provided.

The cylindrical body 27 formed by the assembly of annular filter elements such as elements 1, with their spacer elements 6 (FIGS. 3 and 4) is arranged between two fixed supports 28, 29 provided in a chamber 30 where the cylindrical body is arranged. The distance between these two supports is such that the filter elements are in a filtration position. The filtration is effected in a centripetal mode.

To effect washing, there are provided the following means. A drain 31 permits emptying the chamber 30 after closing the inlet (25a) and the outlet (26) of the filter.

In the axis of the chamber 30 and of the body 27, there is arranged a radial nozzle 32 carried at the lower end of an axial tube 33 integral with an axial threaded rod 34 integral with an actuation wheel 35. This wheel is movable between an upper position, filtration being represented by chain-dotting and the lower position, end of washing being represented in continuous lines. The tube 33 may rotate and slide in a fixed guiding tube 36 through which pressure liquid used for the washing is supplied.

The jet coming out of the nozzle 32 exerts a sufficient pressure on the inner area of the body 27 that it strikes, to force the portion of adjacent discs of this area to spread apart locally, thereby allowing the jet to clean this area of the filter. Thereafter, the cleaning liquid laden with the material which had been retained by the filter goes out through the drain 31. By rotating the wheel 35 at an appropriate speed, the entire circumference of a slot is cleaned by degrees, and then one slot after the other. Then the wheel having reached its lower position being represented in a continuous line, is brought back upwards against the filter (to seal its screw by co-operation of the part 35a with the O-Ring 35b), the cleaning liquid supply is stopped, the drain valve is closed and the (inlet-outlet) valves which had been closed are opened, and thus a new filtration phase starts.

Calculations show that the width of a slot between the rings may be doubled, at the location struck by the jet, by distributing only 10% of the strain on the other flexible connections.

Such a filter may be mounted alone or in duo when a continuous filtration without any interruption, is desired. As a matter of fact, the instantaneous flow rate of the cleaning liquid is low and the washing operation is longer than in the preceding examples. This embodiment has the advantage of being mountable in the suction side as well as on a pressure conduit.

Figure 8:
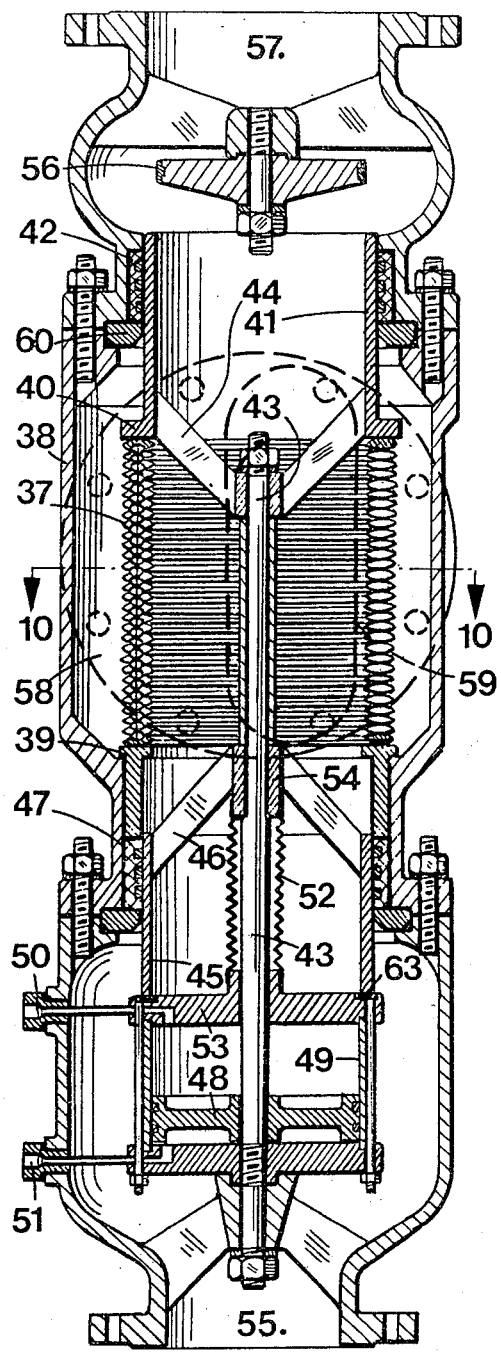
FIG. 8 is an axial cross-section view of a fourth embodiment of the invention showing the members in a filtration position.
Figure 10:
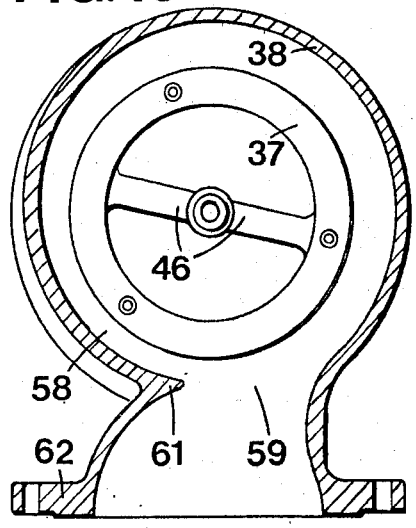
FIG. 10 is a cross-sectional view along 10—10 of FIGS. 8 and 9.
Figure 9:
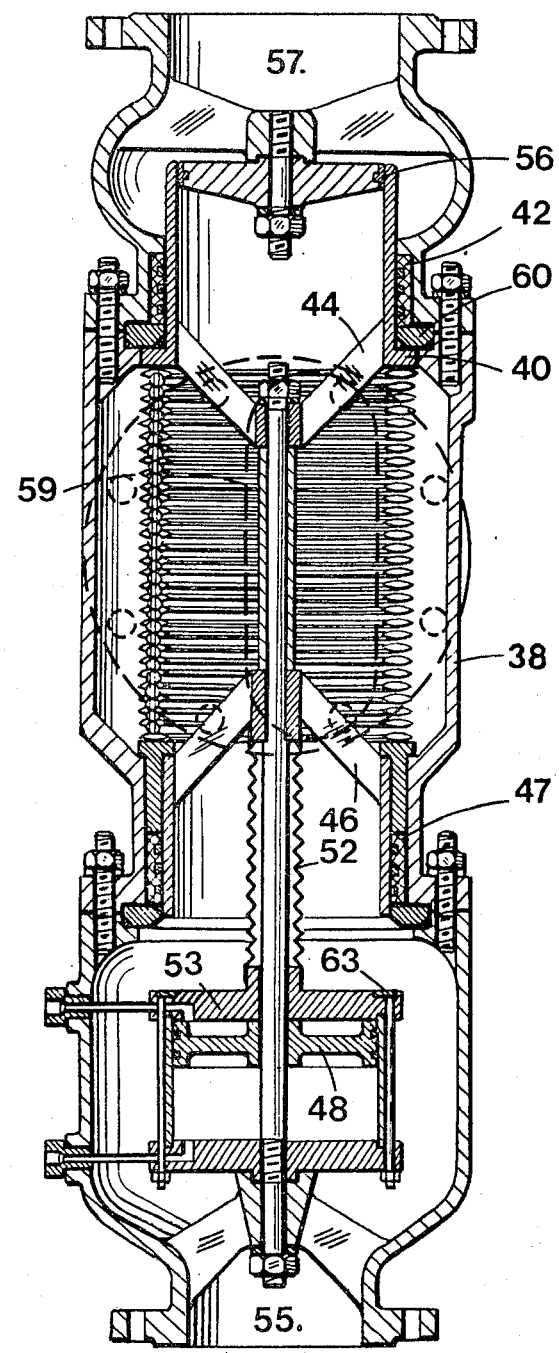
FIG. 9 is a view similar to FIG. 8, but illustrates the members of the fourth embodiment in a counter-current cleaning position.

The following embodiment is represented in the filtration phase in FIG. 8 and in the washing phase on FIG. 9. The filtering body 37 is similar to that of described examples in reference to FIGS. 3 to 6, in other words its (axial) length varies between a minimum corresponding to the filtration phase (FIG. 8) and a maximum corresponding to cleaning phase (FIG. 9). Here again to simplify the drawing, the spacer elements 6 of FIGS. 3 and 4, which are present in all embodiments or forms of execution described have not been described.

Contrary to the preceding embodiments, filtration (FIG. 8) is effected in a centrifugal mode in the filtering body 37 and the cleaning in a centripetal mode.

The filtering body 37 is arranged inside a coaxial envelope 38, between a stop 39 fixed with respect to this body and a moving stop 40 integral with a cylindrical sleeve 41 sliding axially and sealingly in a portion 42 fixed with respect to the envelope 38. This sleeve 41 is integral with an axial control rod 43, owing to radial arms 44. Another cylindrical sleeve 45 is integral with the axial control rod 43, owing to radial arms 46. This sleeve 45 slides sealingly in a portion 47 fixed with respect to the envelope 38.

The control rod 43 is integral with a piston 48 sliding in a cylinder 49 fixed with respect to the envelope 38. A conduit 50 opens into the cylinder 49, above the piston 48. Another conduit 51 opens into the cylinder 49, above the piston 48.

A sealing bellows 52 is arranged around the control rod 43 and is fixed, at one end, on a fixed bottom 53 of the cylinder through which the rod 43, passes and at its other end, on a portion 54 integral with the rod 43.

In the filtration position, the lower edge of the sleeve 45 abuts against a sealing ring 63 secured on the bottom 53 and thus closes communication between the inside of the filtering body 37 and a discharge conduit 55 which purpose is indicated hereafter.

In this position, the sleeve 41 is in the lower position, where its upper portion is remote from a fixed cylindrical part 56, which is intended to close the supply 57 of the liquid to be filtered, when the sleeve 41 co-operates therewith.

The operation of this last embodiment is the as follows:

In the filtration position according to FIG. 8, the liquid to be filtered enters at 57, into the center chamber of the filtering body 37, passes between the annular filtration elements of this body, reaches the annular chamber 58 comprised between the envelope 38 and the outside of the body 37 and from there goes to the filtered liquid outlet 59. In the meantime, a pressurized fluid supplied at 50 and which had brought down the piston 48 into a lower position, continues to actuate on this piston and keeps the piston in the filtration position. The discharge at 51 is then open.

To pass to a cleaning phase, the control of the piston 48 is reversed, in other words, the evacuation 51 is connected to the pressurized fluid supply inlet at the same time that 50 is connected to the discharge. The piston 48 then passes to its upper position and the members take the position illustrated in FIG. 9. The resilient spacer members 6 on FIGS. 3 and 4, being pressed, act in the same direction as the piston 48. The stop 40 is moved upwards until it is stopped by a fixed ring 60. The filter elements are then in a spaced apart filtration position and the sleeve 41 co-operates with part 56 to tightly close the inlet in the filter of liquid to be filtered which could come from 57. The sleeve 45 has withdrawn from the seal 63 and the communication is open between the inside of the filtering body 37 and the discharge 55, while washing liquid is allowed to enter at 59.

There is provided at 59 a deflector 61, which forces the liquid entering the annular chamber 58 to take a rotary motion embracing the filtering body 37 on its entire length. As a matter of fact, the shape of the passage section area of 59, passes from the circular shape in the flange 62, to an elongated shape of which the extension is equal to the length of the filtering body 37 in a maximum extension. Consequently, the washing liquid passes uniformly on the entire periphery and the entire length of the body 37, through the slots, now widened, existing between the filtration rings. A complete and uniform cleaning of the filtering body 37 is thus provided.

It will be noted that the sleeve 41 and the fixed cylindrical co-operating portion 56 are arranged so that, for efficiency and safety purposes, the slots open for the washing only when the counter-current washing has already been initiated.

It is to be noted that in the examples of filters represented and described, the aim has been to design a filtering body provided with the best possible efficiency and cleaning, ratther than to try to increase the filtering surface in order to obtain a maximum flow rate. The priority has been given to hydraulic considerations as to the back-washing circuit, rather than to the filtration circuit, in order to have the best possible distribution during the back-wash and then be sure to effectively clean all the slots of the filtering body. As a fact, what is essential, is to clean all the parts of the filter, at each cleaning phase, so that it may operate efficiently in each consecutive cleaning phase.

Although only spacer elements formed by rubber balls or similar have been described, these elements could also be provided in other shapes, as long as they work in a friction free condition, as for example, springs. It is understood that the above-described embodiments are intended as non-limiting examples and that other modifications and variations of the invention may be made without departing from the spirit and scope thereof.

What is claimed is:

1. A disc filter body for a filter of the counter-current flow cleaning type, comprising: a series of coaxial annular shaped solid filter elements having a hydrodynamic lenticular cross-section, said elements each having circumferentially-spaced alveoli located on opposite sides of the elements; resiliently yieldable spacer elements located in said alveoli, each spacer element having a central channel in alignment with the channels of adjacent spacer elements, capable of being opened or substantially closed by varying the pressure exerted on said spacer elements, thereby forming a generally cylindrical shaped assembly providing annular filtering passages between said filter elements and a central cylindrical flow channel extending axially along the length of said assembly; and means for varying the distance between said filter elements by varying pressure exerted on the spacer elements for changing said filter body from a filtering mode to a cleaning mode.

2. A filter body according to claim 1, wherein said means for varying the distance between the adjacent filter elements are arranged to exert pressure on said elements parallel to the axis of said assembly, whereby due to the resiliency of the spacer elements, the distance between the filter elements varies simultaneously and uniformly in response to said pressure variation.

3. A filter body according to claim 1, wherein the filtration is effected centripetally and there is provided at least one annular deflector axially arranged within said flow channel said deflector adapted to direct the flow of cleaning liquid towards the elements to perform a uniform cleaning along the filter body.

4. A filter body according to claim 3, wherein the spacer elements are blocks of substantially incompressible resiliently yieldable material.

5. A filter body according to claim 1, wherein the filtration is effected centripetally and there is provided a limiting wall around said body to provide an annular chamber on its entire length, and a deflector arranged in said flow channel to force the washing liquid during the counter-current cleaning to proceed around said assembly at a substantially uniform rate on the entire periphery surface of said assembly.

6. A filter body according to claim 5, wherein the spacer elements are blocks of substantially incompressible resiliently yieldable material.

7. A filter body according to claim 1, wherein the filtration is effected centripetally and there is provided a counter-current cleaning nozzle mounted on a support, said nozzle being adapted to be rotated helically in said flow channel and about the axis of said elements so as to generate at the location where the jet exiting from the nozzle strikes said filter elements during the cleaning a pressure which locally spreads the portions of two adjacent filter elements, while the liquid flow effects cleaning by passing through the separation of the filter elements.

8. A filter body according to claim 1, wherein the spacer elements are blocks of substantially incompressible resiliently yieldable material.

9. A disc filter body according to claim 1, wherein one end of the filter body is closed by a support part attached to a compression spring, whereby the minimum spacing between the filter elements during filtering is controlled by moving the support part against a stop by action of said compression spring, and the maximum spacing between the filter elements during cleaning is controlled by the coils of said spring contacting the adjacent coils.

10. A disc filter body according to claim 1, wherein said means for varying the spacing between the adjacent filter elements comprises a hydraulic piston.

11. A disc filter body for a filter of the counter-current flow cleaning type, comprising:
- (a) a series of coaxial annular shaped solid filter elements, said elements having a hydrodynamic lenticular shaped cross-section, and each element having three circumferentially spaced alveoli axially aligned on opposite sides of the elements said filter elements forming a central cylindrical flow channel extending axially along the length of said filter body;
- (b) resilient yieldable spacer elements arranged locally in said alveoli between said filter elements to provide filtering spaces between the filter elements and provide a cylindrical shaped filter body, each spacer element having a central channel in alignment with the channels of adjacent spacer elements, capable of being opened or substantially closed by varying the pressure exerted on said spacer elements; and
- (c) means for varying the distance between the adjacent filter elements by varying the pressure exerted axially on the filter and spacer elements and thereby varying the distance between the filter elements in response to said pressure variation for changing the filter body from a filtering mode to a cleaning mode of operation.

12. A disc type filter assembly of the counter-current flow cleaning type, comprising:
- (a) a chamber having inlet and outlet connections for alternately introducing and removing a liquid being filtered and a washing liquid;
- (b) a disc filter body mounted within said chamber, said body comprising a series of adjacent solid ring-shaped filter elements having a hydrodynamic lenticular cross-section, each separated from the adjacent elements by resilient spacer elements, said spacer elements being located between adjacent filter element rings in alveoli located on opposite sides of the filter elements rings said filter elements forming a central cylindrical flow channel extending axially along the length of said filter body, each of said spacer elements having a central channel in alignment with the channels of adjacent spacer elements, capable of being open or substantially closed by varying the pressure exerted on said spacer elements; and
- (c) means for varying the spacing between said filter elements by varying the force exerted axially on said resilient spacer elements, whereby the spacing between adjacent filter elements is uniformly increased during the cleaning mode operation of the filter assembly.

13. A method for filtering fluids using a disc type counter-current filter body, comprising:
- (a) applying axial pressure to a filter body comprising multiple adjacent ring-shaped filter elements having a hydrodynamic lenticular cross-section, each separated by resilient spacer elements and providing narrow spaces between the filter elements during a filtering mode said filter elements forming a central cylindrical flow channel extending axially along the length of said filter body, each of said spacer elements having a central channel in alignment with the channels of adjacent spacer elements, capable of being open or substantially closed by varying the pressure exerted on said spacer elements;
- (b) passing a fluid through the narrow spaces between the multiple adjacent filter elements in said filter body and retaining particles on the filtering elements;
- (c) releasing the axial pressure on said filter body, thereby permitting the resilient spacer elements to expand and increase the spacing between the adjacent filter elements during a cleaning mode; and
- (d) flowing a fluid through said wider spaces in direction opposite to the filtering mode flow direction to wash the collected particles from the filter body.

14. A filtering method according to claim 13, wherein the filtering fluid flow through said filter body is in centripetal direction and the washing fluid flow is in centrifugal direction.

15. A filtering method according to claim 13, wherein the axial pressure is applied to said filter body during the filtering mode and released during the cleaning mode by operation of a hydraulic piston.

* * * * *